United States Patent
Shindo et al.

(10) Patent No.: US 10,344,104 B2
(45) Date of Patent: Jul. 9, 2019

(54) COPOLYMER FOR POLYMER BLEND COMPATIBILIZER AND RESIN COMPOSITION

(71) Applicant: Denka Company Limited, Tokyo (JP)

(72) Inventors: Yuichi Shindo, Ichihara (JP); Kohhei Nishino, Ichihara (JP); Masamichi Endo, Ichihara (JP); Yoshinari Kurokawa, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/571,179

(22) PCT Filed: May 18, 2016

(86) PCT No.: PCT/JP2016/064785
§ 371 (c)(1),
(2) Date: Nov. 1, 2017

(87) PCT Pub. No.: WO2016/186142
PCT Pub. Date: Nov. 24, 2016

(65) Prior Publication Data
US 2018/0134820 A1 May 17, 2018

(30) Foreign Application Priority Data
May 19, 2015 (JP) .................................. 2015-102065

(51) Int. Cl.
| | | |
|---|---|---|
| *C08F 8/32* | (2006.01) | |
| *B60R 13/02* | (2006.01) | |
| *C08F 212/08* | (2006.01) | |
| *C08L 55/02* | (2006.01) | |
| *C08L 77/02* | (2006.01) | |
| *C08F 8/48* | (2006.01) | |

(52) U.S. Cl.
CPC ................ *C08F 8/32* (2013.01); *B60R 13/02* (2013.01); *C08F 8/48* (2013.01); *C08F 212/08* (2013.01); *C08L 55/02* (2013.01); *C08L 77/02* (2013.01); *C08F 2800/20* (2013.01); *C08F 2810/50* (2013.01); *C08L 2205/02* (2013.01); *C08L 2205/03* (2013.01); *C08L 2205/035* (2013.01); *C08L 2205/06* (2013.01); *C08L 2205/08* (2013.01)

(58) Field of Classification Search
None
See application file for complete search history.

(56) References Cited

U.S. PATENT DOCUMENTS

| | | | |
|---|---|---|---|
| 4,421,892 A | 12/1983 | Kasahara et al. | 524/514 |
| 5,202,379 A | 4/1993 | Aoki et al. | 525/66 |
| 5,965,666 A | 10/1999 | Koo et al. | 525/66 |
| 2006/0281871 A1* | 12/2006 | Steffl | C08L 77/00 525/426 |
| 2011/0319567 A1 | 12/2011 | Noguchi et al. | 525/205 |
| 2012/0071601 A1 | 3/2012 | Tai et al. | 524/494 |

FOREIGN PATENT DOCUMENTS

| | | |
|---|---|---|
| CN | 102807752 A | 12/2012 |
| JP | S 60-047304 B2 | 10/1985 |
| JP | H 1-318060 A | 12/1989 |
| JP | H 3-277648 A | 12/1991 |
| JP | H 7-242794 A | 9/1995 |
| JP | 2007-217621 A | 8/2007 |
| JP | 2007-224287 A | 9/2007 |
| JP | 2008-156468 A | 7/2008 |
| WO | WO 2011/030778 A1 | 3/2011 |

OTHER PUBLICATIONS

International Search Report dated Jul. 26, 2016, issued to the corresponding International Application No. PCT/JP2016/064785.
European Search Report dated Mar. 28, 2018, issued to European Application No. 16796535.9.

* cited by examiner

*Primary Examiner* — Ana L. Woodward
(74) *Attorney, Agent, or Firm* — Stein IP, LLC

(57) ABSTRACT

An object of the present invention is to provide a copolymer for a compatibilizer capable of increasing impact resistance strength, heat resistance and toughness without lowering fluidity. The copolymer for a compatibilizer contains polyamide resin and at least one resin selected from ABS resin, SAN resin, ASA resin, AES resin. A resin composition comprising 0.5 to 11 mass % of copolymer (A) for a polymer blend compatibilizer, 25 to 60 mass % of polyamide resin (B), and 29 to 74.5 mass % of resin (C) is formed. The resin (C) is at least one resin selected from ABS resin, SAN resin, ASA resin, and AES resin. The copolymer (A) for a polymer blend compatibilizer has 30 to 60 mass % of a maleimide-based monomer unit, 35 to 69 mass % of a styrene-based monomer unit, 1 to 5 mass % of unsaturated dicarboxylic anhydride monomer unit, and has a weight average molecular weight (Mw) of 60,000 to 125,000.

4 Claims, No Drawings

COPOLYMER FOR POLYMER BLEND COMPATIBILIZER AND RESIN COMPOSITION

CROSS-REFERENCE TO RELATED APPLICATIONS

This application is a national stage of International Application No. PCT/JP2016/064785 filed May 18, 2016, which claims the benefit of Japanese Application No. 2015-102065, filed May 19, 2015, in the Japanese Patent Office, the disclosures of which are incorporated herein in their entireties by reference.

TECHNICAL FIELD

The present invention relates to a copolymer for a polymer blend compatibilizer of a polyamide resin and at least one resin selected from ABS resin, SAN resin, ASA resin, and AES resin.

BACKGROUND ART

Since polyamide resins are excellent in chemical resistance, abrasion resistance, electrical characteristics, etc., they are widely used as engineering plastics for automobile parts and electric and electronic devices. On the other hand, impact resistance may be insufficient in applications such as automobile interior materials and casings of electric and electronic devices. As a technology for improving the impact strength, there is the following: a rubber reinforced plastic such as ABS resin is used as a polymer blend material with the polyamide resin, and a compatibilizer is generally added. In recent years, due to the complicated member shape, high fluidity is required.

CITATION LIST

Patent Literature

[Patent Literature 1] Japanese Unexamined Patent Application Publication No. H1-318060
[Patent Literature 2] Japanese Examined Patent Publication No. S60-47304
[Patent Literature 3] Japanese Unexamined Patent Application Publication No. H 7-242794
[Patent Literature 4] Japanese Unexamined Patent Application Publication No. H 3-277648
[Patent Literature 5] Japanese Unexamined Patent Application Publication No. 2007-217621

SUMMARY OF INVENTION

Technical Problem

An object of the present invention is to provide a copolymer for a polymer blend compatibilizer of a polyamide resin and at least one resin selected from ABS resin, SAN resin, ASA resin, and AES resin. The obtained resin composition is excellent not only in fluidity but also in balance of physical properties such as impact strength, heat resistance and toughness.

Solution to Problem

That is, the present invention is as follows.
(1) A copolymer (A) for a polymer blend compatibilizer having 30 to 60 mass % of a maleimide-based monomer unit, 35 to 69 mass % of a styrene-based monomer unit, and 1 to 5 mass % of an unsaturated dicarboxylic anhydride monomer unit, and having a weight average molecular weight (Mw) of 60,000 to 125,000.
(2) The copolymer (A) for a polymer blend compatibilizer of (1), wherein the glass transition temperature is 170 to 200° C.
(3) A resin composition comprising 0.5 to 11 mass % of the copolymer (A) for a polymer blend compatibilizer of (1) or (2), 25 to 60 mass % of a polyamide resin(B), and 29 to 74.5 mass % of a resin (C), wherein the resin (C) is at least one resin selected from ABS resin, SAN resin, ASA resin, and AES resin, and a total of the (A), (B), (C) is 100 mass %.
(4) The resin composition of claim (3), wherein a content of a rubbery polymer contained in the resin (C) is 10 to 45 mass % in the resin composition.
(5) A molded article obtained by molding the resin composition of (3) or (4).
(6) An automotive interior material using the molded article of claim (5).

Advantageous Effects of Invention

By using the copolymer for a polymer blend compatibilizer of the present invention, it is possible to obtain a resin composition that is excellent in heat resistance and excellent in balance of physical properties such as mechanical strength, appearance, moldability and the like. The resin composition obtained is useful for automobiles, household appliances, OA equipment, and the like. In particular, since it is excellent in fluidity, it is suitable for parts having complicated shapes such as automobile interior materials.

DESCRIPTION OF EMBODIMENTS

<Explanation of Terms>
In the present specification, for example, the expression "A to B" means A or more and B or less.
Hereinafter, embodiments of the present invention will be described in detail.
The copolymer (A) for a polymer blend compatibilizer of the present invention has a maleimide-based monomer unit, a styrene-based monomer unit, and an unsaturated dicarboxylic anhydride monomer unit. In the present invention, copolymer (A) may further contain an acrylonitrile-based monomer unit.
Examples of the maleimide-based monomer unit include N-alkylmaleimide such as, N-methylmaleimide, N-butylmaleimide, N-cyclohexylmaleimide and the like, and N-phenylmaleimide, N-chlorophenylmaleimide, N-methylphenylmaleimide, N-methoxyphenylmaleimide, N-tribromophenylmaleimide and the like. Among these, N-phenylmaleimide is preferred. The maleimide-based monomer unit can be used alone, or two or more kinds can be used in combination. For the maleimide-based monomer unit, for example, a raw material consisting of a maleimide-based monomer can be used. Alternatively, it can be obtained by imidizing a raw material consisting of an unsaturated dicarboxylic acid monomer unit with an ammonia or a primary amine.
The styrene-based monomer unit is styrene, o-methylstyrene, m-methylstyrene, p-methylstyrene, 2,4-dimethylstyrene, ethylstyrene, p-tert-butylstyrene, α-methylstyrene, α-methyl-p-methylstyrene and the like. Among these, styrene is preferred. The styrene-based monomer unit can be used alone, or two or more kinds can be used in combination.

The unsaturated dicarboxylic anhydride-based monomer unit is maleic anhydride, itaconic anhydride, citraconic anhydride, aconitic anhydride and the like. Among these, maleic anhydride is preferred. The unsaturated dicarboxylic anhydride-based monomer unit can be used alone, or two or more kinds can be used in combination.

The acrylonitrile-based monomer unit is acrylonitrile, methacrylonitrile, ethacrylonitrile, fumaronitrile and the like. Among these, acrylonitrile is preferred. The acrylonitrile-based monomer unit can be used alone, or two or more kinds can be used in combination.

The weight average molecular weight (Mw) of the copolymer (A) is 60,000 to 125,000, preferably 80,000 to 120,000, more preferably 90,000 to 110,000. If the weight average molecular weight (Mw) is too small, the impact strength of the resin composition obtained by using the copolymer (A) may decrease. If it is too large, the fluidity of the resin composition obtained by using the copolymer (A) may decrease, and the moldability may be deteriorated. From the viewpoint of fluidity, the Mw of the copolymer is preferably 79000 or less. In order to control the weight average molecular weight (Mw) of the copolymer (A), there are methods such as adjusting the solvent concentration and the addition amount of the chain transfer agent, in addition to adjusting the polymerization temperature, polymerization time, and the addition amount of the polymerization initiator. The weight average molecular weight of the copolymer (A) is a polystyrene equivalent value measured by gel permeation chromatography (GPC) under the following conditions.

Device name: SYSTEM-21 Shodex (available from Showa Denko K.K.)
Column: Three PL gel MIXED-B series
Temperature: 40° C.
Detection: Differential refractive index
Solvent: Tetrahydrofuran
Concentration: 2 mass %
Calibration curve: it was prepared using standard polystyrene (PS) (available from PL).

The unsaturated dicarboxylic anhydride monomer unit of the copolymer (A) is 1 to 5 mass %, preferably 1 to 3 mass %. If the amount of the unsaturated dicarboxylic anhydride monomer unit is too small, the impact strength of the resin composition obtained using the copolymer (A) may decrease. If the amount is too large, the fluidity of the resin composition obtained by using the copolymer (A) may decrease, and the moldability may be deteriorated. The amount of the unsaturated dicarboxylic anhydride-based monomer unit is a value measured by titration method.

The constituent unit of the copolymer (A) is 30 to 60 mass % of a maleimide-based monomer unit, 35 to 69 mass % of a styrene-based monomer unit, 1 to 5 mass % of an unsaturated dicarboxylic anhydride monomer unit, preferably 35 to 55 mass % of a maleimide-based monomer unit, 42 to 64 mass % of a styrene-based monomer unit, 1 to 3 mass % of an unsaturated dicarboxylic anhydride monomer unit, more preferably 40 to 50 mass % of a maleimide-based monomer unit, 47 to 59 mass % of a styrene-based monomer unit, 1 to 3 mass % of an unsaturated dicarboxylic anhydride monomer unit. When the maleimide-based monomer unit, the styrene-based monomer unit, and the unsaturated dicarboxylic anhydride monomer unit are within the above-mentioned ranges, the copolymer (A) has excellent heat resistance, fluidity and thermal stability. Further, the compatibility with the resin (C) which is at least one resin selected from ABS resin, SAN resin, ASA resin and AES resin described later is improved, and the impact strength of the resin composition is excellent. The amounts of the maleimide-based monomer unit and the styrene-based monomer unit are values measured by 13C-NMR.

From the viewpoint of efficiently dispersing the copolymer (A) in the resin composition obtained using the copolymer (A), the glass transition temperature of the copolymer (A) is preferably 170 to 200° C., more preferably 175 to 195° C., still more preferably 180 to 190° C. The glass transition temperature of the copolymer (A) is a value measured by DSC under the measurement conditions described below.

Device name: Robot DSC6200 (Manufactured by Seiko Instruments Inc.)
programming rate: 10° C./min The term "glass transition temperature" as used in the present invention refers to the temperature at the intersection of a straight line extending the base line on the low temperature side to the high temperature side and a tangent line drawn at a point where the gradient of the curve of the step change portion of the glass transition becomes maximum, that is, the extrapolated glass transition starting temperature.

As a method for producing the copolymer (A), a known method can be adopted. For example, there is a method of copolymerizing a monomer mixture comprising a styrene-based monomer, a maleimide-based monomer, an unsaturated dicarboxylic anhydride-based monomer, and other copolymerizable monomers. There is a method in which after copolymerizing a monomer mixture comprising the styrene-based monomer, the unsaturated dicarboxylic anhydride-based monomer, and other copolymerizable monomers, a part of the unsaturated dicarboxylic anhydride-based monomer unit is imidized by reacting with an ammonia or a primary amine, and converted into a maleimide-based monomer unit (Hereinafter referred to as "post imidization method").

The polymerization mode of the copolymer (A) is, for example, solution polymerization, bulk polymerization and the like. Solution polymerization is preferable from the viewpoint that the copolymer composition becomes more uniform by carrying out polymerization while carrying out separate addition and the like. The solvent for solution polymerization is preferably non-polymerizable from the viewpoint that by-products are difficult to form and adverse effects are small. Examples thereof include ketones such as acetone, methyl ethyl ketone, methyl isobutyl ketone and acetophenone; ethers such as tetrahydrofuran and 1,4-dioxane; aromatic hydrocarbons such as benzene, toluene, xylene and chlorobenzene; N,N-dimethylformamide, dimethyl Sulfoxide, N-methyl-2-pyrrolidone and the like. Methyl ethyl ketone and methyl isobutyl ketone are preferable from the viewpoint of ease of solvent removal at the time of devolatilization recovery of the maleimide copolymer. As the polymerization process, any of the continuous polymerization, batch polymerization, semi-batch polymerization can be applied. The polymerization method is not particularly limited, but radical polymerization is preferable in view of manufacturing by a simple process with high productivity.

In the solution polymerization or bulk polymerization, a polymerization initiator and a chain transfer agent can be used, and the polymerization temperature is preferably in the range of 80 to 150° C. Examples of the polymerization initiator include azole-based compound such as azobisisobutyronitrile, azobiscyclohexanecarbonitrile and azobismethylbutyronitrile; peroxides such asbenzoyl peroxide, t-butyl peroxybenzoate, 1,1-di (t-butylperoxy) cyclohexane, t-butyl peroxy isopropyl monocarbonate, t-butyl peroxy-2-ethyl hexanoate, di-t-butyl peroxide, dicumyl peroxide, ethyl-3, 3-di-(t-butylperoxy) butyrate and the like. One kind or a combination of two or more of these polymerization initiators may be used. From the viewpoint of controlling the reaction rate of polymerization and the polymerization rate, it is preferable to use an azo compound or organic peroxide having a 10-hour half-life temperature of 70 to 120° C. The amount of the polymerization initiator to be used is not particularly limited, but it is preferably 0.1 to 1.5 mass %, more preferably 0.1 to 1 mass % with respect to 100 mass % of the total monomer units. It is preferable that the amount of the polymerization initiator used is 0.1 mass % or more, since sufficient polymerization rate can be obtained. When the amount of the polymerization initiator used is 1.5 mass % or less, the polymerization rate can be suppressed, so that the reaction control becomes easy and the target molecular weight can be easily obtained. Examples of the chain transfer agent include n-octyl mercaptan, n-dodecyl mercaptan, t-dodecyl mercaptan, α-methyl styrene dimer, ethyl thioglycolate, limonene, terpinolene and the like. The amount of the chain transfer agent used is not particularly limited as long as it is within the range where the target molecular weight can be obtained, but it is preferably 0.1 to 0.8 mass %, more preferably 0.15 to 0.5 mass % with respect to 100 mass % of the total monomer units. When the amount of the chain transfer agent used is 0.1 to 0.8 mass %, the target molecular weight can be easily obtained.

Introduction of the maleimide-based monomer unit of the copolymer (A) includes a method of copolymerizing maleimide-based monomers and a postimidization method. The postimidization method is preferable because the amount of residual maleimide-based monomer in the copolymer (A) is reduced. The postimidization method is a method in which after copolymerizing a monomer mixture comprising a styrene-based monomer, an unsaturated dicarboxylic anhydride-based monomer, and other copolymerizable monomers, imidizing a part of the unsaturated dicarboxylic anhydride-based monomer unit with an ammonia or a primary amine, so as to converting into the maleimide-based monomer unit. Examples of the primary amine include alkylamines such as methylamine, ethylamine, n-propylamine, iso-propylamine, n-butylamine, n-pentylamine, n-hexylamine, n-octylamine, cyclohexylamine, decylamine and the like; aromatic amine such as Chloro- or bromo-substituted alkylamine, aniline, toluidine, naphthylamine and the like. Among these, aniline is preferred. These primary amines may be used alone or in combination of two or more. In the postimidization, in the reaction of the primary amine and the unsaturated dicarboxylic anhydride monomer unit, a catalyst can be used to improve the dehydration cyclization reaction. The catalyst is, for example, tertiary amine such as trimethylamine, triethylamine, tripropylamine, tributylamine, N,N-dimethylaniline or N,N-diethylaniline. The postimidization temperature is preferably 100 to 250° C., more preferably 120 to 200° C. From the viewpoint of productivity, it is preferable that the temperature of the imidization reaction is 100° C. or higher, since the reaction rate can be improved. It is preferable that the temperature of the imidization reaction is 250° C. or lower, since the deterioration of physical properties due to thermal degradation of the copolymer (A) can be suppressed.

A known method can be adopted as a method (devolatilization method) for removing volatile components such as solvents used for solution polymerization and unreacted monomers from the solution after completion of the solution polymerization of the copolymer (A) or the solution after completion of the postimidization. For example, a vacuum devolatilizing tank equipped with a heater or a devolatilizing extruder equipped with a vent can be used. The devolatilized copolymer for compatibilizer in a molten state can be transferred to the granulation process, extruded from the porous die in a strand form, and processed into a pellet shape by a cold cut method, an air hot cut method, or an underwater hot cut method.

The amount of the maleimide-based monomer remaining in the copolymer (A) is preferably 300 ppm or less, more preferably 250 ppm or less. When the amount of the remaining maleimide-based monomer is within the above range, the hue of the copolymer (A) is excellent. The amount of the remaining maleimide-based monomer can be adjusted by the polymerization condition or devolatilization condition, and is a value determined by reprecipitation method.

The copolymer (A) can be used as a compatibilizer for a polymer blend of the polyamide resin(B) and the resin (C) which is at least one resin selected from ABS resin, SAN resin, ASA resin, AES resin. Polymer blend is a state in which two or more kinds of resins having different compositions are mixed by heat, shearing, or the like. In general, since the polymer blend of the polyamide resin and ABS resin, SAN resin, ASA resin, AES resin and the like is an incompatible system, physical properties such as impact strength are hardly improved even by simple mixing. By using the copolymer (A), the compatibility of the polyamide resin with ABS resin, SAN resin, ASA resin, AES resin and the like can be suitably improved, and physical properties such as impact strength are improved.

Examples of the polyamide resin (B) include nylon-6, nylon-6,6, nylon-4,6, nylon-6,7, nylon-6,10, nylon-11, nylon-12 and the like. Among these, nylon-6 is preferable. The polyamide resin (B) can be used alone, or two or more kinds can be used in combination.

The molecular weight of the polyamide resin (B) is not particularly limited, but from the viewpoint of flowability, the melt viscosity at 270° C. under the condition that the shear rate is 100 sec−1 is preferably 50 to 200 Pa·s, more preferably 75 to 175 Pa·s, still more preferably 100 to 125 Pa·s.

The resin (C) is selected from ABS resin, SAN resin, ASA resin, AES resin, and can be used alone, or two or more kinds can be used in combination.

The ABS resin, ASA resin, and AES resin are graft copolymers obtained by graft copolymerizing at least a styrene-based monomer and an acrylonitrile-based monomer to a rubbery polymer. For example, when a butadiene rubber such as polybutadiene or styrene-butadiene copolymer is used as the rubbery polymer, the resin (C) is ABS resin. When an acrylic-based rubber comprising butyl acrylate or ethyl acrylate is used, the resin (C) is ASA resin. When an ethylene-based rubber such as ethylene-α-olefin copolymer is used, the resin (C) is AES resin. At the time of graft copolymerization, two or more of these rubbery polymers can be used in combination.

As a production method of a graft copolymer such as ABS resin, a known method can be adopted. For example, a production method by emulsion polymerization or continuous bulk polymerization can be mentioned. The method by emulsion polymerization is preferable because the content of the rubbery polymer in the final resin composition can be easily adjusted.

As a production method of a graft copolymer by emulsion polymerization, there is a method in which a styrene-based monomer and an acrylonitrile-based monomer are emulsion-graft-copolymerized in a latex of the rubbery polymer (Hereinafter referred to as "emulsion graft polymerization method"). A latex of the graft copolymer can be obtained by the emulsion graft polymerization method.

In the emulsion graft polymerization method, water, an emulsifier, a polymerization initiator, and a chain transfer agent are used, and the polymerization temperature is preferably in the range of 30 to 90° C. Examples of the emulsifier include anionic surfactant, onion surfactant, amphoteric surfactant and the like. Examples of the polymerization initiator include organic peroxides such as cumene hydroperoxide, diisopropylbenzene peroxide, t-butyl peroxyacetate, t-hexyl peroxybenzoate, t-butyl peroxybenzoat; persulfates such as potassium persulfate and ammonium persulfate; azo-based compounds such as azobisbutyronitrile; reducing agents such as iron ion; secondary reducing agents such as sodium formaldehyde sulfoxylate; and chelating agents such as Ethylenediaminetetraacetic acid disodium etc. Examples of the chain transfer agent include n-octyl mercaptan, n-dodecyl mercaptan, t-dodecyl mercaptan, α-methyl styrene dimer, ethyl thioglycolate, limonene, terpinolene and the like.

The latex of the graft copolymer can be solidified by a known method to recover the graft copolymer. For example, a coagulant is added to the latex of the graft copolymer to solidify it, and the graft copolymer is washed and dehydrated in a dehydrator, and subjected to a drying step, thereby a powdery graft copolymer is obtained.

From the viewpoint of impact resistance, the content of the rubbery polymer in the graft copolymer obtained by the emulsion graft polymerization method is preferably 40 to 70 mass % of preferably, more preferably 45 to 65% by mass. The content of the rubbery polymer can be adjusted by, for example, the use ratio of the styrene-based monomer and the acrylonitrile-based monomer to the rubbery polymer at the time of the emulsion graft polymerization.

From the viewpoint of impact resistance and chemical resistance, the constitutional units excluding the rubbery polymer of the graft copolymer obtained by the emulsion graft polymerization method are preferably 65 to 85 mass % of a styrene-based monomer unit, and 15 to 35 mass % of an acrylonitrile-based monomer unit.

The gel component of the graft copolymer is preferably in the form of particles. The gel component is a rubbery polymer particle obtained by graft copolymerizing a styrene-based monomer and an acrylonitrile-based monomer, which is insoluble in an organic solvent such as methyl ethyl ketone or toluene, and separated by centrifugal separation. In some cases, an occlusion structure in which a styrene-acrylonitrile copolymer is encapsulated in particles is formed inside the rubbery polymer particles. When the graft copolymer and the styrene-acrylonitrile copolymer are melt blended, the gel component exists as a dispersed phase in the form of particles in the continuous phase of the styrene-acrylonitrile copolymer. The gel content is a value calculated as follows. The graft copolymer of mass W is dissolved in methyl ethylene ketone, and centrifuged at 20,000 rpm using a centrifuge to precipitate the insoluble matter, and the supernatant liquid is removed by decantation to obtain the insoluble matter, and from the mass S of dried insoluble matter after vacuum drying, the gel content (mass %)=(S/W)×100 is calculated. Similarly, the resin composition obtained by melt blending the graft copolymer and the styrene-acrylonitrile copolymer is dissolved in methyl ethyl ketone and centrifuged, thereby the gel content can be calculated.

From the viewpoint of the impact resistance and the appearance of the molded article, the volume average particle diameter of the gel component of the graft copolymer is preferably in the range of 0.1 to 1 μm, more preferably 0.15 to 0.5μ. The volume average particle diameter is a value calculated as follows. Ultra thin sections are cut out from the pellets of a resin composition obtained by melt blending a graft copolymer and a styrene-acrylonitrile copolymer, observed with a transmission electron microscope (TEM), and calculated from the image analysis of particles dispersed in the continuous phase. The volume average particle size can be adjusted by, for example, the particle diameter of the latex of the rubbery polymer used in the emulsion graft polymerization. The particle diameter of the latex of the rubbery polymer can be adjusted by the method of adding the emulsifier and the amount of water used during the emulsion polymerization, in order to obtain a preferable range, the polymerization time is long and the productivity is low, so that there is a method in which rubbery polymers having a particle diameter of about 0.1 μm is polymerized in a short time and the rubber particles are enlarged by chemical aggregation method or physical aggregation method.

The graft ratio of the graft copolymer is preferably 10 to 100 mass %, more preferably 20 to 70 mass % from the viewpoint of impact resistance. The graft ratio is a value calculated from the graft ratio (mass %)=[(G−RC)/RC]×100 based on the gel content (G) and the content of the rubbery polymer (RC). The graft ratio represents the amount of the styrene-acrylonitrile copolymers contained in per unit mass of the rubbery polymer. The styrene-acrylonitrile copolymers may be bonded to particles of the rubbery polymer by the graft or may be encapsulated in the particles. The graft ratio can be adjusted by, for example, the ratio of the monomer and the rubbery polymer, the kind and amount of the initiator, the amount of the chain transfer agent, the amount of emulsifier, polymerization temperature, feeding method (lump/multistage/continuous), addition rate of monomer and the like during the emulsion graft polymerization.

The degree of toluene swelling of the graft copolymer is preferably 5 to 20 times from the viewpoint of impact resistance and appearance of the molded article. The degree of toluene swelling represents the degree of crosslinking of the particles of the rubbery polymer, and is calculated as follows. The graft copolymer is dissolved in toluene, insoluble matter is separated by centrifugation or filtration, and a value is calculated from the ratio of the mass in a state of being swollen with toluene and the mass in a dry state where toluene is removed by vacuum drying. The degree of toluene swelling, for example, is influenced by the degree of crosslinking of the rubbery polymer used in the emulsion graft polymerization, and can be adjusted by initiator, emulsifier, polymerization temperature, addition of polyfunctional monomer such as divinylbenzene, etc. during the emulsion polymerization of the rubbery polymer.

The SAN resin is a copolymer having a styrene-based monomer unit and an acrylonitrile-based monomer unit, such as a styrene-acrylonitrile copolymer.

As other copolymerizable monomers of the SAN resin, (meth) acrylic acid este-based monomer such as methyl methacrylate; acrylic ester-based monomer such as butyl acrylate and ethyl acrylate; (meth) acrylic acid-based monomer such as methacrylic acid; acrylic acid-based monomer such as acrylic acid; N-substituted maleimide-based monomer such as N-phenyl maleimide and the like can be used.

The constituent unit of the SAN resin is preferably 60 to 90 mass % of styrene-based monomer unit and 10 to 40 mass % of vinyl cyanide monomer unit, more preferably 65 to 80 mass % of styrene-based monomer unit and 20 to 35 mass % of vinyl cyanide monomer unit. When the constituent unit is within the above range, the balance between impact strength and fluidity of the obtained resin composition is excellent. The amounts of the styrene-based monomer unit and vinyl cyanide monomer unit are values measured by 13C-NMR.

As a production method of the SAN resin, a known method can be adopted. For example, it can be produced by bulk polymerization, solution polymerization, suspension polymerization, emulsion polymerization and the like. As an operation method of the reaction apparatus, any of the continuous type, batch type, semi-batch type can be applied. From the viewpoint of quality and productivity, bulk polymerization or solution polymerization is preferable, and continuous type is preferable. Examples of the solvents for bulk polymerization or solution polymerization include alkylbenzene such as benzene, toluene, ethylbenzene and xylem; ketone such as acetone and methyl ethyl ketone; aliphatic hydrocarbon such as hexane and cyclohexane, and the like.

For bulk polymerization or solution polymerization of SAN resin, a polymerization initiator and a chain transfer agent can be used, and the polymerization temperature is preferably in the range of 120 to 170° C. Examples of the polymerization initiator include peroxy ketal such as 1,1-di (t-butylperoxy) cyclohexane, 2,2-di (t-butylperoxy) butane, 2,2-di (4,4-di-t-butylperoxycyclohexyl) propane, 1,1-di (t-amylperoxy) cyclohexane; hydroperoxide such as cumene hydroperoxide and t-butyl hydroperoxide; alkyl peroxide such as t-butyl peroxyacetate and t-amyl peroxy isononanoate; dialkyl peroxide such as t-butyl cumyl peroxide, di-t-butyl peroxide, dicumyl peroxide, di-t-hexyl peroxide; peroxyester such as t-butyl peroxyacetate, t-butyl peroxybenzoate and t-butylperoxy isopropyl monocarbonate; peroxy carbonate such as t-butyl peroxy isopropyl carbonate and polyether tetrakis (t-butyl peroxy carbonate); N,N'-azobis (cyclohexane-1-carbonitrile), N,N'-azobis (2-methylbutyronitrile), N,N'-azobis (2,4-dimethylvaleronitrile), N,N'-azobis [2-(hydroxymethyl) propionitrile] and the like. These polymerization initiators may be used alone or in combination of two or more. Examples of the chain transfer agent include n-octyl mercaptan, n-dodecyl mercaptan, t-dodecyl mercaptan, α-methyl styrene dimer, ethyl thioglycolate, limonene, terpinolene and the like.

A known method can be adopted as a devolatilization method for removing unreacted monomers and volatile components such as solvents used for solution polymerization from the solution after completion of polymerization of SAN resin. For example, a vacuum devolatilizing tank equipped with a heater or a devolatilizing extruder equipped with a vent can be used. The devolatilized molten SAN resin can be transferred to the granulation process, extruded from the porous die in a strand form, and processed into a pellet shape by a cold cut method, an air hot cut method, or an underwater hot cut method.

The weight average molecular weight of SAN resin is preferably 50,000 to 250,000, more preferably 70,000 to 200,000 from the viewpoint of impact resistance and moldability of the resin composition. The weight average molecular weight of SAN resin is a polystyrene equivalent value measured in a THF solvent using gel permeation chromatography (GPC), and is a value measured by the same method as that of the copolymer (A). The weight average molecular weight can be adjusted by the kind and amount of the chain transfer agent, the solvent concentration, the polymerization temperature, the kind and amount of the polymerization initiator.

The resin composition using the copolymer (A) for a polymer blend compatibilizer of the present invention, contains 0.5 to 11 mass % of copolymer (A), 25 to 60 mass % of polyamide resin(B), and 29 to 74.5 mass % of resin (C). The resin (C) is at least one resin selected from ABS resin, SAN resin, ASA resin, AES resin.

The content of the copolymer (A) in the resin composition is preferably 0.5 to 11 mass %, more preferably 0.5 to 10 mass %, more preferably 0.5 to 9.5 mass %, more preferably 2 to 9 mass %, more preferably 3 to 8 mass %, particularly preferably 4 to 7% mass %. If the content of the copolymer (A) is too small, the impact strength and heat resistance of the resin composition may not be sufficiently improved. If the content is too large, the fluidity of the resin composition is lowered, and the moldability may be deteriorated.

The content of the polyamide resin (B) in the resin composition is preferably 25 to 60 mass %, more preferably 28 to 57 mass %, still more preferably 35 to 55 mass %. The content of the resin (C) which is at least one resin selected from ABS resin, SAN resin, ASA resin, AES resin is preferably 29 to 74.5 mass %, more preferably 34 to 70 mass %, still more preferably 37 to 62 mass %. The total of (A), (B) and (C) is 100 mass %.

When SAN resin is used, it is preferable to use a graft copolymer in combination. The graft copolymer and SAN resin are preferably 15 to 50 mass % and 14 to 24.5 mass %, respectively. More preferably, the contents of the graft copolymer and the SAN resin are respectively 20 to 40 mass % and 14 to 30 mass %, more preferably 25 to 35 mass % and 12 to 27 mass %. The polyamide resin(B) and the resin (C) which is at least one resin selected from ABS resin, SAN resin, ASA resin, AES resin are within the above ranges, the balance of physical properties of the obtained resin composition (polymer blend) is excellent.

The content of the rubbery polymer contained in the resin (C) in the resin composition is preferably 10 to 45 mass %, more preferably 15 to 30 mass %. If the content of the rubbery polymer is too small, the impact strength of the resin composition may not be sufficiently improved. If the content is too large, the fluidity of the resin composition is lowered, and the moldability may be deteriorated. The content of the rubbery polymer can be adjusted by the content of the graft copolymer in the resin composition.

The resin composition is obtained by melt-kneading the copolymer (A), the polyamide resin (B), and the resin (C) which is at least one resin selected from ABS resin, SAN resin, ASA resin, AES resin. As the resin (C), for example, powdered ABS resin obtained by emulsion polymerization method and pelletized SAN resin obtained by continuous bulk polymerization method can be used, or a resin obtained by preliminarily melt blending the powdered ABS resin obtained by emulsion polymerization method and the pelletized SAN resin obtained continuous bulk polymerization method in an extruder or the like, and forming pelletized ABS resin can be used.

A known method, for example, melt-kneading by an extruder can be adopted as a method of melt-kneading the copolymer (A), the polyamide resin(B), and the resin (C) which is at least one resin selected from ABS resin, SAN resin, ASA resin, AES resin. As the extruder, known devices such as twin-screw extruder, single screw extruder, multi-screw extruder, continuous kneader with biaxial rotor can be used. Meshing type co-rotating twin-screw extruder is widely used in general, and can be suitably used. Also, a plurality of these extruders may be used in combination. Although there is no particular restriction on the extruder and the extrusion temperature, from the viewpoint of efficiently dispersing the copolymer for compatibilizer, it is preferable to melt-knead at 260° C. or higher by using a twin-screw extruder.

If necessary, additives, for example heat stabilizers such as hindered phenol-based compounds, lactone-based compounds, phosphorus-based compounds and sulfur-based compounds; light stabilizers such as hindered amine-based compounds and benzotriazole-based compounds; lubricants, plasticizers, colorants, impact modifiers, hardness modifiers, antistatic agents, flame retardants, mineral oils may be added to the resin composition. These additives may be used alone, or two or more kinds can be used in combination. These additives can be added during manufacture or extrusion of the copolymer (A) for compatibilizer, the polyamide resin (B) or the resin (C).

As a molding method of the resin composition, a known method can be adopted. Examples thereof include injection molding, sheet extrusion molding, vacuum molding, blow molding, foam molding, and hetero-extrusion molding. At the time of molding, the thermoplastic resin composition is usually processed after being heated to 200 to 300° C., preferably 220 to 280° C. Molded articles can be used for automobiles, household appliances, OA equipments, residential building materials, daily necessities, and the like.

EXAMPLES

The present invention is described in further details below with Examples. The present embodiments are not limited to them.

<Manufacturing Example of Copolymer (A-1)>

To an autoclave having a capacity of about 25 L equipped with an agitator, 65 parts by mass of styrene, 7 parts by mass of maleic anhydride, 0.4 parts by mass of 2,4-diphenyl-4-methyl-1-pentene, 25 parts by mass of methyl ethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a polymer solution of styrene-maleic anhydride copolymer. Then, 30 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-1) in pellet form was obtained. The amount of the remaining maleimide-based monomer in the copolymer (A-1) was 250 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 98,000.

<Manufacturing Example of Copolymer (A-2)>

To an autoclave having a capacity of about 25 L equipped with an agitator, 65 parts by mass of styrene, 7 parts by mass of maleic anhydride, 0.7 parts by mass of 2,4-diphenyl-4-methyl-1-pentene, 25 parts by mass of methyl ethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a polymer solution of styrene-maleic anhydride copolymer. Then, 31 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-2) in pellet form was obtained. The amount of the remaining maleimide-based monomer in the copolymer (A-2) was 230 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 75,000.

<Manufacturing Example of Copolymer (A-3)>

To an autoclave having a capacity of about 25 L equipped with an agitator, 65 parts by mass of styrene, 7 parts by mass of maleic anhydride, 0.3 parts by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a polymer solution of styrene-maleic anhydride copolymer. Then, 31 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-3) in pellet form was obtained. The amount of the remaining maleimide-based monomer in the copolymer (A-3) was 190 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 107,000.

<Manufacturing Example of Copolymer (A-4)>

To an autoclave having a capacity of about 25 L equipped with an agitator, 65 parts by mass of styrene, 7 parts by mass of maleic anhydride, 0.2 part by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a styrene-maleic anhydride copolymer. Then, 31 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-4) in pellet form was obtained. The amount of the remaining maleimide-based monomer in the copolymer (A-4) was 210 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 119,000.

<Manufacturing Example of Copolymer (A-5)>

To an autoclave having a capacity of about 25 L equipped with an agitator, 65 parts by mass of styrene, 7 parts by mass of maleic anhydride, 1.2 parts by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a styrene-maleic anhydride copolymer. Then, 31 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-5) in pellet form was obtained. The amount of the remaining maleimide-based monomer in the copolymer (A-5) was 220 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 45,000.

<Manufacturing Example of Copolymer (A-6)>

To an autoclave having a capacity of about 25 L equipped with an agitator, 65 parts by mass of styrene, 7 parts by mass of maleic anhydride, 0.1 parts by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a styrene-maleic anhydride copolymer. Then, 31 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-6) in pellet form was obtained. The amount of the remaining maleimide-based monomer in the copolymer (A-6) was 220 ppm. The constituent units were 52 mass % of styrene unit, 46 mass % of N-phenylmaleimide unit, 2 mass % of maleic anhydride unit. The glass transition temperature measured by DSC was 186° C. The weight average molecular weight was 145,000.

<Copolymer (A-7)>

To an autoclave having a capacity of about 25 L equipped with an agitator, 65 parts by mass of styrene, 7 parts by mass of N-phenylmaleimide, 0.2 part by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of N-phenylmaleimide and 0.18 parts by mass of t-butylperoxy-2-ethylhexanoate were dissolved in 100 parts by mass of methyl ethyl ketone was added continuously for 7 hours. After the addition, 0.03 part by mass of t-butylperoxy-2-ethylhexanoate was further added, and the temperature was raised to 120° C. The reaction was further continued for 1 hour to obtain a styrene-N-phenylmaleimide copolymer. The polymer solution was fed to a vent type screw extruder, and volatile components were removed, so that a copolymer (A-7) in pellet form was obtained. The amount of the remaining maleimide-based monomer in the copolymer (A-7) was 240 ppm. The constituent units were 52 mass % of styrene unit and 48 mass % of N-phenylmaleimide unit. The glass transition temperature measured by DSC was 186° C. The weight average molecular weight was 120,000.

<Manufacturing Example of Copolymer (A-8)>

To an autoclave having a capacity of about 25 L equipped with an agitator, 65 parts by mass of styrene, 7 parts by mass of maleic anhydride, 0.2 part by mass of 2,4-diphenyl-4-methyl-1-pentene, 25 parts by mass of methylethyl ketone were added. After replacing the inside of the system with nitrogen gas, the temperature was raised to 92° C. A solution in which 28 parts by mass of maleic anhydride and 0.18 part by mass of t-butylperoxy-2-ethylhexanoate were dissolved in 100 parts by mass of methyl ethyl ketone was added continuously for 7 hours. 0.03 part by mass of t-butylperoxy-2-ethylhexanoate was further added, and the temperature was raised to 120° C. The reaction was further continued for 1 hour to obtain a styrene-maleic anhydride copolymer. Then, 25 parts by mass of aniline and 0.6 part by mass of triethylamine were added to the polymer solution, and reacted at 140° C. for 7 hours. The polymer solution after the imidization reaction was fed to a vent type screw extruder, and volatile components were removed, so that a copolymer (A-8) in pellet form was obtained. The amount of the remaining maleimide-based monomer in the copolymer (A-8) was 200 ppm. The constituent units were 52 mass % of styrene unit, 42 mass % of N-phenylmaleimide unit, 6 mass % of maleic anhydride unit. The glass transition temperature measured by DSC was 186° C. The weight average molecular weight was 120,000.

<Polyamide Resin (B-1)>

As the polyamide resin (B-1), nylon-6 (the melt viscosity at 270° C. and a shear rate of 100 sec−1 is 113 Pa·s.) obtained from ε-caprolactam by a solution polymerization method was used.

<Manufacturing Example of ABS Resin (C-1)>

ABS resin (graft ABS resin) (C-1) was prepared by emulsion graft polymerization method. To a reactor equipped with an agitator, 97 parts by mass of polybutadiene latex (solid concentration: 50 mass %, average particle diameter: 0.3 μm), 12 parts by mass of a styrene-butadiene latex having a styrene content of 24% mass % (solid concentration: 70 mass %, average particle diameter: 0.5 μm), 1 part by mass of sodium stearate, 0.2 part by mass of sodium formaldehyde sulfoxylate, 0.01 part by mass of ethylenediaminetetraacetic acid tetrasodium, 0.005 part by mass of ferrous sulfate, and 200 parts of pure water were added. The temperature was heated to 50° C. Then 43 parts by mass of a monomer mixture of 75 mass % of styrene and 25 mass % of acrylonitrile, 0.2 part by mass of t-dodecyl mercaptan, 0.06 parts by mass of t-butyl peroxyacetate were continuously added separately and for 5 hours. After completion of separate addition, 0.04 part by mass of diisopropyl enesemoxide was added and the polymerization was completed at 70° C. for 2 hours to obtain a latex of ABS resin. To the obtained latex, 0.3 part of Irganox 1076 (manufactured by Ciba Specialty Chemicals Co., Ltd.) was added. Coagulation was carried out using magnesium sulfate and sulfuric acid so that the pH of the slurry at the time of solidification was 6.8. After washing and dehydrating, drying was carried out, and powdered ABS resin (C-1) was obtained. The rubbery polymer content is 57 mass %, based on the compounding ratio of the raw materials. In the constituent unit excluding the rubbery polymer, the styrene unit was 75 mass % and the acrylonitrile unit was 25 mass % as measured by NMR. From the observation of the transmission electron microscope after forming the resin composition, the ABS resin was dispersed in the form of particles and the volume average particle diameter was 0.4 μm.

<Manufacturing Example of SAN Resin (C-2)>

SAN resin (C-2) was prepared by continuous bulk polymerization. One complete mixing tank type stirring tank was used as a reactor and polymerization was carried out with a capacity of 20 L. A raw material solution containing 60 mass % of styrene, 22 mass % of acrylonitrile, 18 mass % of ethylbenzene was prepared and continuously fed to the reactor at a flow rate of 6.5 L/h. Further, with respect to the raw material solution, 160 ppm of t-butyl peroxyisopropyl monocarbonate as a polymerization initiator and 400 ppm of n-dodecyl mercaptan as a chain transfer agent were continuously added to the feed line of the raw material solution. The reaction temperature of the reactor was adjusted to be 145° C. The polymer solution continuously withdrawn from the reactor was supplied to a vacuum devolatilizing tank equipped with a preheater to separate unreacted styrene, acrylonitrile, ethylbenzene. The temperature of the preheater was adjusted so that the polymer temperature in the devolatilization tank was 225° C. and the pressure in the devolatilizing tank was 0.4 kPa. The polymer was withdrawn from the vacuum devolatilizing tank by a gear pump, extruded in a strand shape, cooled with cooling water, and then cut to obtain a pelletized SAN resin (C-2). The constituent units were 74 mass % of styrene unit, and 26 mass % of acrylonitrile unit. The weight average molecular weight was 145,000.

<Manufacturing Example of ABS Resin (C-3)>

ABS resin (C-3) was obtained by melt-kneading 43 mass % of ABS resin (C-1), and 57 mass % of SAN resin (C-2) with a twin-screw extruder. The extrusion was carried out at a screw rotation speed of 250 rpm and at a feed rate of 30 kg/hr in an extruder. From the compounding ratio of the raw materials, the rubbery polymer content was 25 mass %, and the constituent unit excluding the rubbery polymer were 75 mass % of styrene unit and 25 mass % of acrylonitrile unit.

EXAMPLES AND COMPARATIVE EXAMPLES

The copolymer for a compatibilizer, polyamide resin, ABS resin, and SAN resin were melt-kneaded at 270° C., 250 rpm and 25 kg/hr using a twin-screw extruder TEM-35B manufactured by Toshiba Machine Co., with the formulations shown in Tables 1 to 3. The obtained strand was cut using a pelletizer to obtain pellets of about 2 mm.

(Melt Mass-Flow Rate)

Melt Mass-Flow Rate JIS was measured at 240° C. and 98 N load according to JIS K 7210.

(Charpy Impact Strength)

The charpy impact strength was measured using a notched specimen in accordance with JIS K 7111-1, and a striking direction adopted Edgewise. The test piece conditioned for 16 hours in a constant temperature bath at 23° C. and 50% humidity was used. A digital impact tester manufactured by Toyo Seiki Seisaku-sho, Ltd. was used as the measuring machine.

(Vicat Softening Temperature)

The vicat softening temperature was measured in accordance with JIS K7206. Here, Method 50 (load: 50N, temperature raising speed 50° C./hour) was used, and the test piece having the size of 10 mm×10 mm and 4 mm thickness was used. The test piece conditioned for 16 hours in a constant temperature bath at 23° C. and 50% humidity was used. HDT & VSPT testing device manufactured by Toyo Seiki Seisaku-sho, Ltd. was used as the measuring machine.

(Nominal Tensile Strain at Break)

The nominal tensile strain at break was measured at a pulling rate of 50 mm/min in accordance with JIS K7161. The test piece conditioned for 16 hours in a constant temperature bath at 23° C. and 50% humidity was used.

(Flexural Modulus)

The flexural modulus was measured at a bending speed of 2 mm/min in accordance with JIS K 7171. The test piece conditioned for 16 hours in a constant temperature bath at 23° C. and 50% humidity was used.

(Content of the Rubbery Polymer)

The content of the rubbery polymer was a value measured by halogen addition under the following conditions.

Solution A: 18 g of iodine monochloride is dissolved in 1000 mL of carbon tetrachloride.

Solution B: 10 g of potassium iodide is dissolved in a mixed solution of 800 mL of water and 200 mL of ethanol.

Solution C: 10 g of sodium thiosulfate is dissolved in 1000 mL of water and the molar concentration is determined by standardization in a conventional manner.

Approximately 0.4 g of the sample was precisely weighed (W (g)) in a 100 mL volumetric flask and 75 mL of chloroform was added and well dispersed. Then, 20 mL of Solution A is added and stored in a cool dark place, and after 8 hours, it is adjusted to the mark with chloroform. 25 mL was collected, added to 60 mL of Solution B, and titrated with Solution C (molarity x). The content of the rubbery polymer is calculated by the following formula.

$$\text{Content of rubbery polymer (mass \% of)} = 10.8 \times x \times (B-A)/W$$

TABLE 1

| | | | Examples | | | | | | |
|---|---|---|---|---|---|---|---|---|---|
| Resin Composition Copolymer (A) | | | 1 | 2 | 3 | 4 | 5 | 6 | 7 |
| Proportion | Copolymer (A-1) | mass % | 5.0 | 7.0 | 1.0 | 3.0 | 10.0 | 12.0 | — |
| | Copolymer (A-2) | mass % | — | — | — | — | — | — | 5.0 |
| | Copolymer (A-3) | mass % | — | — | — | — | — | — | — |
| | Copolymer (A-4) | mass % | — | — | — | — | — | — | — |
| | Copolymer (A-5) | mass % | — | — | — | — | — | — | — |
| | Copolymer (A-6) | mass % | — | — | — | — | — | — | — |
| | Copolymer (A-7) | mass % | — | — | — | — | — | — | — |
| | Copolymer (A-8) | mass % | — | — | — | — | — | — | — |

TABLE 1-continued

|  |  |  |  |  |  |  |  |  |  |
|---|---|---|---|---|---|---|---|---|---|
|  | Polyamide Resin (B-1) | mass % | 48.0 | 48.0 | 52.0 | 48.0 | 43.0 | 43.0 | 48.0 |
|  | Graft ABS Resin (C-1) | mass % | 30.0 | 30.0 | 30.0 | 30.0 | 30.0 | 30.0 | 30.0 |
|  | SAN Resin (C-2) | mass % | 17.0 | 15.0 | 17.0 | 19.0 | 17.0 | 15.0 | 17.0 |
| Evaluation | MFR | g/10 min | 67 | 65 | 72 | 70 | 55 | 51 | 73 |
|  | Charpy Impact Strength | kJ/m2 | 64 | 62 | 35 | 62 | 58 | 46 | 49 |
|  | Vicat Softening Temperature | ° C. | 116 | 119 | 105 | 112 | 123 | 129 | 115 |
|  | Nominal Tensile Strain at Break | % | 112 | 100 | 82 | 113 | 95 | 81 | 109 |
|  | Flexural Modulus | MPa | 1,660 | 1,700 | 1,590 | 1,640 | 1,700 | 1,780 | 1,600 |
|  | Content of Rubbery Polymer | mass % | 17.1 | 17.1 | 17.1 | 17.1 | 17.1 | 17.1 | 17.1 |

|  |  |  | Examples | | Comparative Examples | | | | |
|---|---|---|---|---|---|---|---|---|---|
| Resin Composition Copolymer (A) | | | 8 | 9 | 1 | 2 | 3 | 4 | 5 |
| Proportion | Copolymer (A-1) | mass % | — | — | — | — | — | — | — |
|  | Copolymer (A-2) | mass % | — | — | — | — | — | — | — |
|  | Copolymer (A-3) | mass % | 5.0 | — | — | — | — | — | — |
|  | Copolymer (A-4) | mass % | — | 5.0 | — | — | — | — | — |
|  | Copolymer (A-5) | mass % | — | — | — | 5.0 | — | — | — |
|  | Copolymer (A-6) | mass % | — | — | — | — | 5.0 | — | — |
|  | Copolymer (A-7) | mass % | — | — | — | — | — | 5.0 | — |
|  | Copolymer (A-8) | mass % | — | — | — | — | — | — | 5.0 |
|  | Polyamide Resin (B-1) | mass % | 48.0 | 48.0 | 48.0 | 48.0 | 48.0 | 48.0 | 48.0 |
|  | Graft ABS Resin (C-1) | mass % | 30.0 | 30.0 | 30.0 | 30.0 | 30.0 | 30.0 | 30.0 |
|  | SAN Resin (C-2) | mass % | 17.0 | 17.0 | 22.0 | 17.0 | 17.0 | 17.0 | 17.0 |
| Evaluation | MFR | g/10 min | 59 | 55 | 80 | 78 | 42 | 76 | 18 |
|  | Charpy Impact Strength | kJ/m2 | 60 | 63 | 6 | 27 | 55 | 7 | 61 |
|  | Vicat Softening Temperature | ° C. | 116 | 116 | 104 | 113 | 116 | 114 | 116 |
|  | Nominal Tensile Strain at Break | % | 110 | 111 | 19 | 60 | 108 | 23 | 103 |
|  | Flexural Modulus | MPa | 1,680 | 1,690 | 1,580 | 1,650 | 1,710 | 1,610 | 1,690 |
|  | Content of Rubbery Polymer | mass % | 17.1 | 17.1 | 17.1 | 17.1 | 17.1 | 17.1 | 17.1 |

TABLE 2

|  |  |  | Examples | Comparative Examples | |
|---|---|---|---|---|---|
| Resin Composition Using Copolymer (A) | | | 10 | 6 | 7 |
| Proportion | Copolymer (A-1) | mass % | 5.0 | — | — |
|  | Copolymer (A-6) | mass % | — | — | 5.0 |
|  | Polyamide Resin (B-1) | mass % | 47.5 | 50.0 | 47.5 |
|  | Graft ABS Resin (C-1) | mass % | 47.5 | 50.0 | 47.5 |
| Evaluation | MFR | g/10 min | 24 | 29 | 15 |
|  | Charpy Impact Strength | kJ/m2 | 75 | 7 | 65 |
|  | Vicat Softening Temperature | ° C. | 109 | 98 | 109 |
|  | Nominal Tensile Strain at Break | % | >200 | 41 | >200 |
|  | Flexural Modulus | MPa | 1,140 | 1,000 | 1,180 |
|  | Content of Rubbery Polymer | mass % | 27.1 | 28.5 | 27.1 |

TABLE 3

|  |  |  | Examples | Comparative Examples | |
|---|---|---|---|---|---|
| Resin Composition Using Copolymer (A) | | | 11 | 8 | 9 |
| Proportion | Copolymer (A-1) | mass % | 5.0 | — | — |
|  | Copolymer (A-6) | mass % | — | — | 5.0 |
|  | Polyamide Resin (B-1) | mass % | 47.5 | 50.0 | 47.5 |
|  | Graft ABS Resin (C-3) | mass % | 47.5 | 50.0 | 47.5 |
| Evaluation | MFR | g/10 min | 124 | 144 | 75 |
|  | Charpy Impact Strength | kJ/m2 | 6 | 2 | 5 |
|  | Vicat Softening Temperature | ° C. | 117 | 112 | 117 |
|  | Nominal Tensile Strain at Break | % | 33 | 7 | 32 |
|  | Flexural Modulus | MPa | 2,030 | 1,970 | 2,050 |
|  | Content of Rubbery Polymer | mass % | 27.1 | 28.5 | 27.1 |

By using the copolymer for a compatibilizer of the examples, it is possible to obtain a resin composition excellent in flowability, impact resistance strength, heat resistance and toughness. On the other hand, the resin composition using the copolymer for a compatibilizer of the comparative example was inferior in one or more physical properties among fluidity, impact resistance strength, heat resistance, and toughness.

INDUSTRIAL APPLICABILITY

Since the resin composition using the copolymer for compatibilizer of the present invention is excellent in heat resistance, mechanical strength, appearance, chemical resistance, balance between formability and fluidity, it can be suitably used particularly for parts having complicated shapes such as automobile interior materials.

The invention claimed is:
1. A resin composition comprising 0.5 to 11 mass % of copolymer (A), 25 to 60 mass % of a polyamide resin (B), and 29 to 74.5 mass % of a resin (C), wherein the resin (C) is at least one resin selected from Acrylonitrile butadiene styrene (ABS) resin, Styrene acrylonitrile (SAN) resin, Acrylate-styrene-acrylonitrile (ASA) resin, and Acrylonitrile ethylene styrene (AES) resin; the ABS resin, the ASA resin and the AES resin are graft copolymers obtained by graft copolymerizing at least a styrene-based monomer and an acrylonitrile-based monomer to a rubbery polymer; the total of (A), (B), (C) is 100 mass %; copolymer (A) comprises 30 to 60 mass % of a maleimide-based monomer unit, 35 to 69 mass % of a styrene-based monomer unit, and 1 to 5 mass % of an unsaturated dicarboxylic anhydride monomer unit on a 100 mass % basis of the monomer units; the glass transition temperature of copolymer (A) is 170 to 195° C.; and the weight average molecular weight (Mw) of copolymer (A) is 60,000 to 110,000.

2. The resin composition of claim 1, wherein the content of the rubbery polymer contained in the resin (C) is 10 to 45 mass % in the resin composition, when the resin (C) comprises at least one of ABS resin, ASA resin, and AES resin.

3. A molded article obtained by molding the resin composition of claim 1.

4. An automotive interior material using the molded article of claim 3.

* * * * *